United States Patent [19]
Imai et al.

[11] Patent Number: 6,049,057
[45] Date of Patent: Apr. 11, 2000

[54] LASER PIERCING APPARATUS FOR MOVING WEB MATERIAL

[75] Inventors: Kiyoshi Imai; Junichi Fukuchi; Michiaki Takatsu, all of Tokyo, Japan

[73] Assignee: Japan Tobacco Inc., Tokyo, Japan

[21] Appl. No.: 09/084,288

[22] Filed: May 26, 1998

[30] Foreign Application Priority Data

May 26, 1997 [JP] Japan .................................. 9-135342

[51] Int. Cl.$^7$ .................................................. B23K 26/00
[52] U.S. Cl. ................................... 219/121.7; 219/121.76
[58] Field of Search ........................... 219/121.62, 121.7, 219/121.71, 121.83, 121.76

[56] References Cited

U.S. PATENT DOCUMENTS

| | | |
|---|---|---|
| 4,297,559 | 10/1981 | Whitman, III . |
| 4,672,168 | 6/1987 | Saunders et al. . |
| 4,947,023 | 8/1990 | Minamida et al. ............ 219/121.76 X |
| 5,341,824 | 8/1994 | Fletcher et al. . |

FOREIGN PATENT DOCUMENTS

| | | |
|---|---|---|
| 0624424A1 | 11/1994 | European Pat. Off. . |
| 61-20686 | 1/1986 | Japan . |
| 5-111782 | 5/1993 | Japan . |
| 5138381A | 6/1993 | Japan . |

*Primary Examiner*—Gregory Mills
*Attorney, Agent, or Firm*—Birch, Stewart, Kolasch & Birch, LLP

[57] ABSTRACT

A piercing apparatus includes a traveling unit for causing a tip paper to travel at a predetermined speed along a traveling path, a plurality of laser piercing heads for irradiating pulsed laser beams onto plural positions which are spaced apart from one another on the traveling path, and a controller for pulse-driving laser oscillators of the laser piercing heads in a manner synchronized with one another at time intervals of a period which varies depending on the tip paper traveling speed, whereby minute holes of a desired size are stably formed with a desired spacing in the tip paper which travels at a high speed. The controller variably adjusts the spacing with which minute holes are formed, by controlling the timings at which drive pulses are supplied to the respective laser piercing heads.

12 Claims, 4 Drawing Sheets

LASER PIERCING APPARATUS FOR MOVING WEB MATERIAL

BACKGROUND OF THE INVENTION

1. Field of the Invention

The present invention relates to a piercing apparatus which is suitable for the formation of minute holes in a web material such as a tip paper used to connect a cigarette with a filter plug.

2. Related Art

Recently, a tip paper of a type formed with minute holes which serve to adjust the air permeability of the tip paper was employed for the production of filter cigarettes. A piercing apparatus for forming such minute holes in a tip paper is known from Japanese Provisional Patent Publication No. 5-138381, for instance. This piercing apparatus is configured to obtain a deflected laser beam, by deflecting, with use of a polygon mirror, a laser beam continuously supplied from a laser source and to irradiate the deflected laser beam via an optical system onto a tip paper which travels at a constant speed, thereby forming minute holes at regular intervals in the tip paper.

In the aforementioned piercing apparatus, the spacial interval at which the minute holes are formed is naturally determined based on a relationship between the traveling speed of the tip paper and the rotational speed of the polygon mirror. Hence, it is difficult to immediately adapt the piercing apparatus to a changeover of kinds of tip papers which necessarily follows the changing of a kind or brand of filter cigarettes to be manufactured by the cigarette manufacturing machine.

Specifically, a required spacing with which minute holes are to be formed in the tip paper varies in dependence on the brand of filter cigarette. In a case where minute holes are formed in multiple rows, moreover, a required number of rows varies depending on the brand of cigarette. To satisfy the requirements of the number of rows and/or the spacing of minute holes, the arrangement of the optical system, the tip paper traveling speed, or the polygon mirror rotational speed must be changed in a piercing apparatus of the aforementioned type. In the case of changing the polygon mirror rotational speed, however, there occurs a substantial change in the intensity of the deflected laser beam irradiated onto the tip paper, so that the size of minute holes changes. Similarly, the hole size changes, if the tip paper traveling speed is changed. Therefore, in order to maintain a desired hole size even when the polygon mirror rotational speed or the tip paper traveling speed is changed on an occasion of changing the tip paper brand, an additional adjustment of the laser beam output intensity must be made.

Recently, a cigarette manufacturing machine is also known of a type continuously supplying a tip paper formed with minute holes to a filter attachment where a tobacco rod is connected through the tip paper with a filter plug, while forming minute holes in a tip paper in a manner interlocking with the operation of a wrapping section where tobacco shreds are wrapped by a wrapping paper. In such a cigarette manufacturing machine, the higher the wrapping speed, the higher the speed at which the tip paper is supplied to the filter attachment will be, so that the tip paper travels at a higher speed.

For the formation of minute holes with minor spacing in a tip paper which travels at a high speed, the polygon mirror must be rotated at a high speed, for instance. Since there are limitations of increasing the polygon mirror rotational speed, the formation of minute holes cannot be properly achieved if a desired spacing with which the minute holes are to be formed is too narrow. As the polygon mirror rotational speed becomes higher, a variation in the polygon mirror rotational speed becomes larger, so that the size of and the spacing between the resultant minute holes tend to vary.

For the aforementioned reasons, with use of a conventional piercing apparatus having a polygon mirror, it is difficult to form minute holes of a required size with a desired spacing in a tip paper which travels at a high speed. Since the size of minute holes formed in a tip paper greatly affects the air permeability of the tip paper, difficulties will be encountered in manufacturing filter cigarette having a required air permeability, if the hole size is deviated from a desired one.

SUMMARY OF THE INVENTION

An object of the present invention is to provide a piercing apparatus for a web material, which is capable of forming minute holes of a desired size in a web material with a desired spacing in a stable manner, even if the web material travels at a high speed.

According to the present invention, there is provided a piercing apparatus for a web material, which comprises: a traveling unit for causing a web material to travel along a traveling path defined in the piercing apparatus; a plurality of laser units for intermittently irradiating laser beams onto plural positions on the traveling path which are spaced apart from one another in a direction along which the web material travels, to thereby form minute holes in the web material which travels along the traveling path; and a control unit for controlling laser beam irradiating actions of the plurality of laser units such that the laser beam irradiating actions are carried out in synchronism with one another.

With the piercing apparatus of the present invention, the plurality of laser units are permitted to simultaneously irradiate laser beams onto plural positions on the traveling path. Thus, a laser beam irradiating period for the entire laser unit arrangement is virtually reduced to a value obtained by dividing an actual irradiating period of each laser unit by the number of the laser units. Hence, the spacing with which minute holes are formed in the web material by means of laser beam irradiation can be made small, even if the laser beam irradiating period of each laser unit is not actually shortened. In other words, the piercing apparatus of this invention having the plurality of laser units can be adapted to the speeding-up of the web material travel. The laser beam irradiating actions controllable by the control unit makes it possible to form minute holes of a desired size with a desired spacing even if a target traveling speed of the web material is changed, e.g., at the time of changing the kind of web material.

Preferably, the piercing apparatus further includes a speed detector for detecting a traveling speed of the web material. The control unit controls the laser beam irradiating actions of the plurality of laser units in accordance with the detected traveling speed of the web material.

With this preferred embodiment, a variation in the size and spacing of minute holes which would be otherwise caused by a variation in web material traveling speed can be removed or reduced.

Preferably, each of the laser units is configured to be pulse-driven to output a pulsed laser beam. The control unit pulse-drives the plurality of laser units. More preferably, each laser unit includes a laser oscillator for generating a pulsed laser beam in response to a supply of drive pulses. The control unit controls at least one of a pulse width of the drive pulses and a time interval at which the drive pulses are generated.

With this preferred embodiment, since the laser units of a pulse-driven type is employed, the laser units are simplified in construction and in control procedure of their laser beam irradiating actions, as compared to a laser unit comprised of a polygon mirror. Further, the size and spacing of minute holes can be made small and can be controlled precisely.

Preferably, the piercing apparatus includes at least three laser units which are pulse-driven.

With this preferred embodiment, a time interval at which drive pulses supplied to each laser unit are generated is not required to be shortened excessively, so that the laser units are operated stably, even if the spacing with which minute holes are formed must be made small considerably.

Preferably, the control unit obtains a delayed drive pulse by time-delaying a standard drive pulse supplied to that laser unit which irradiates a laser beam onto a lowermost or uppermost position, among the plural positions, as viewed in the traveling direction of the web material, and supplies the delayed drive pulse to another laser unit or an associated one of the other laser units.

With this preferred embodiment, the plurality of laser units are permitted to perform their laser beam irradiating actions in a manner properly synchronized with one another. By controlling the width (duration) of the standard drive pulse, the size of minute holes can be controlled precisely.

Preferably, a delay time for which the delayed drive pulse is delayed relative to the standard drive pulse is determined in dependence on the traveling speed of the web material.

With this embodiment, influences of a variation in the traveling speed of the web material on the spacing with which minute holes are formed can be removed or reduced.

More preferably, a delay time for which the delayed drive pulse is delayed relative to the standard drive pulse is determined in accordance with a target spacing with which the minute holes are to be formed, the traveling speed of the web material, and a distance between the positions at which the laser beams are irradiated from those laser units which are supplied with the standard drive pulse and the delayed drive pulse, respectively.

With this preferred embodiment, minute holes can be formed with a desired spacing, without the need of modifying the construction of and positional relationship between the laser units, even if a target traveling speed of the web material is changed, e.g., to follow the changing of the kind of web material. Minute holes having a desired size can be formed by using the standard drive pulse having a proper width.

Preferably, the web material is a tip paper used to connect a cigarette with a filter plug.

With this preferred embodiment, the formation of minute holes in a tip paper are controllable, thereby making it possible to adjust the air permeability of the tip paper to a desired one, whereby the quality of a filter cigarette comprised of such a tip paper can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

With reference to the appended drawings, a piercing apparatus for a web material according to an embodiment of the present invention will be explained.

Figure 1:
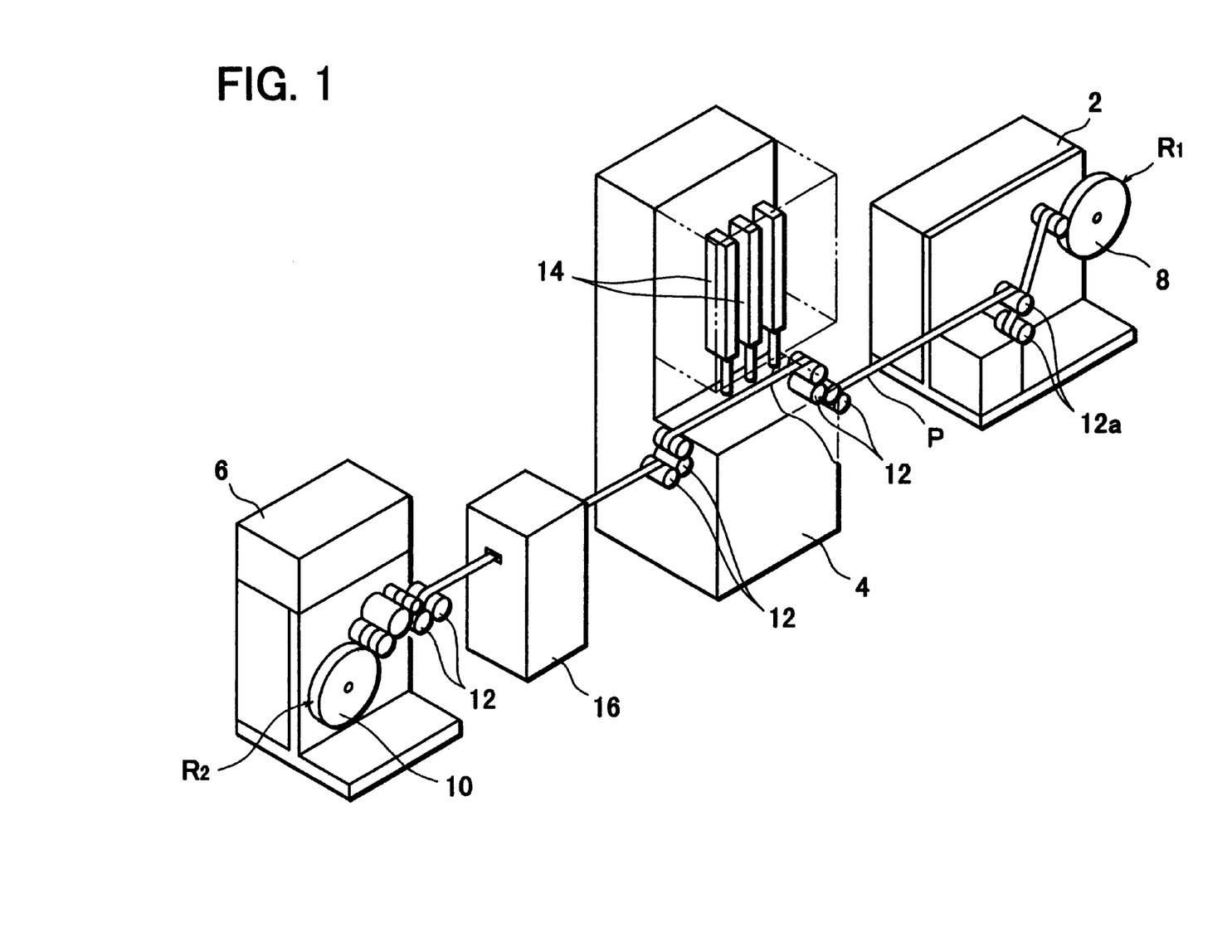
FIG. 1 is a schematic perspective view showing a piercing apparatus according to an embodiment of the present invention.

In FIG. 1, a piercing apparatus of a single bobbin type is shown which is designed to form, with use of a laser beam, minute holes in a tip paper serving as a web material. The piercing apparatus is comprised of a feeding section 2, a piercing section 4, and a winding section 6 which are spaced from one another. The feeding section 2 has a rotary shaft (not shown) thereof mounted with a bobbin 8 to which a feed roll R1 of a tip paper P is attached. The winding section 6 has a rotary shaft (not shown) thereof mounted with a winding bobbin 10 for winding the tip paper P formed with minute holes at the piercing section 4. Symbol R2 denotes a roll of the tip paper P on the winding bobbin 10.

Guide rollers 12 and 12a are rotatably mounted to the feeding, piercing and winding sections 2, 4 and 6. The tip paper P fed from the feed roll Ri passes the piercing section 4 to reach the winding bobbin 10, while being guided by the guide rollers 12 and 12a. These guide rollers 12 and 12a serve to define a traveling path along which the tip paper P travels. A pair of guide rollers 12a are spaced vertically from each other in the feeding section 2 and have a function of suppressing and correcting a snaking travel of the tip paper P. The winding section 6 cooperates with the guide rollers 12 and 12a to constitute a traveling unit for causing the tip paper P to travel.

Although not illustrated in detail, the rotary shaft of the winding section 6 is coupled to an electrically-driven motor through a powder clutch. A powder brake is attached to the rotary shaft of the feeding section 2. The winding bobbin 10 is rotatively driven in one direction by the electrically-driven motor. With rotation of the winding bobbin 10, the tip paper P is fed from the feed roll R1 and is formed with minute holes while passing the piercing section 4. Then, the tip paper P is wound on the winding bobbin 10. During this time, the tip paper P travels at a constant speed along the traveling path extending between the feed roll R1 and the winding bobbin 10. A feeding tension applied to the tip paper P fed from the feed roll R1 is maintained at nearly constant by means of the powder brake, and a winding tension applied to the tip paper P wound on the winding bobbin 10 is also maintained at nearly constant by the powder clutch.

The piercing section 4 is provided with a first, second and third laser piercing heads 141, 142 and 143 serving as three laser units and located above the traveling path of the tip paper P. These laser piercing heads 141, 142 and 143 are disposed in this order as seen from the upstream side of the tip paper traveling direction. In the following explanation, the laser piercing heads 141, 142 and 143 are sometimes collectively denoted by reference numeral 14, and each laser piercing head is sometimes denoted by reference numeral 14.

Figure 2:
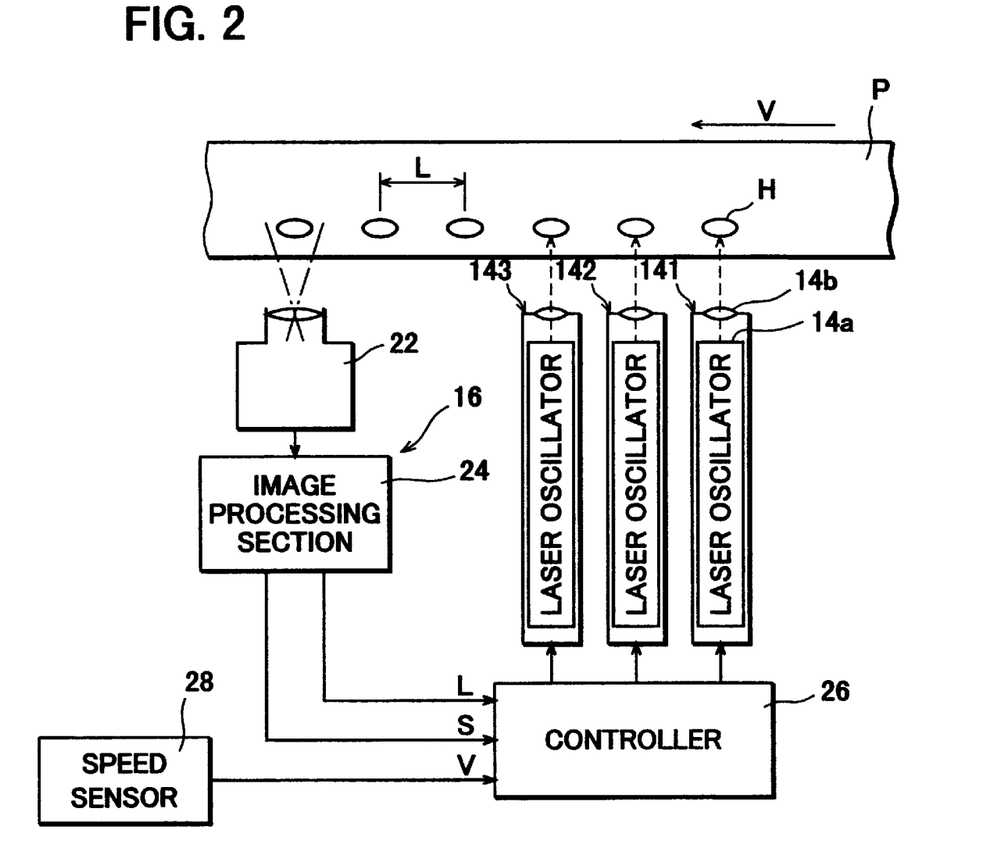
FIG. 2 is a schematic view showing primary parts of the piercing apparatus shown in FIG. 1, together with a tip paper which travels along a traveling path.

As shown in FIG. 2, the three laser piercing heads 14 are disposed to face an upstream-side portion of the tip paper traveling path and each operate to intermittently irradiate a laser beam, e.g., by irradiating a pulsed laser beam, onto an associated one of three positions on the traveling path which are spaced at minute spacial intervals L0 in the tip paper traveling direction. Each time the three laser piercing heads 14 simultaneously operate to irradiate the laser beams, therefore, the tip paper P which travels at a predetermined speed V along the traveling path is formed with three minute holes at a time with a minute spacing L.

In the present embodiment, three small-sized laser piercing heads 14 are juxtaposed with a spacial interval which is the same as the interval L0 between adjacent ones of the positions to which the laser beams are irradiated, whereby the laser beams irradiated from these heads 14 are in parallel to one another. In some cases, the laser piercing heads 14 each have a widthwise dimension which is larger than the laser beam irradiated position distance L0, and hence these heads 14 cannot be disposed at the same interval as the laser beam irradiated position distance L0. In such a case, if necessary, the laser piercing heads 14 may be so disposed as to be displaced one another in the widthwise direction of the tip paper traveling path, with their laser beam axes tilted, for instance, so that the laser beams from these laser piercing heads 14 may be irradiated onto those positions on the tip paper traveling path which are spaced at minute intervals L0.

In this embodiment, each of the laser piercing heads 14 is comprised of a carbon dioxide gas laser oscillator 14a of a pulse-driven type for generating a pulsed laser beam, and an optical system which includes a condensing lens 14b for focusing and irradiating the pulsed laser beam onto the tip paper P. In the following, the respective laser oscillators of the first, second and third laser piercing heads 141, 142 and 143 are sometimes distinctively denoted by reference numerals 141a, 142a and 143a and are sometimes referred to as a first, second and third laser oscillators, respectively.

Preferably, the three laser piercing heads 14 are supported by appropriate support means (not shown) so as to be movable in the widthwise and/or lengthwise directions of the tip paper traveling path, thereby permitting fine adjustments of the positions to which the pulsed laser beams are irradiated.

Further, an inspection unit 16 is provided between the piercing section 4 and the winding section 6. The inspection unit 16 serves to optically inspect minute holes which are formed in the tip paper P by laser beams irradiated thereto, thereby detecting pieces of information to be utilized for a control of the laser beam irradiating actions of the laser piercing heads 14, such as the size (area S and/or length (in this embodiment, area S)) of and the pitch or spacing L between the minute holes. As shown in FIG. 2, the inspection unit 16 is disposed to face a downstream-side portion of the tip paper traveling path at a location downstream of the laser piercing heads 14, and is comprised of a camera 22 for picking up an image. of, e.g., the surface of the tip paper P, and an image processing section 24 for measuring, based on the image, the area S of and the spacing L between the minute holes H. The image processing section 24 outputs data indicative of minute hole area S and data indicative of minute hole spacing L.

Figure 3:
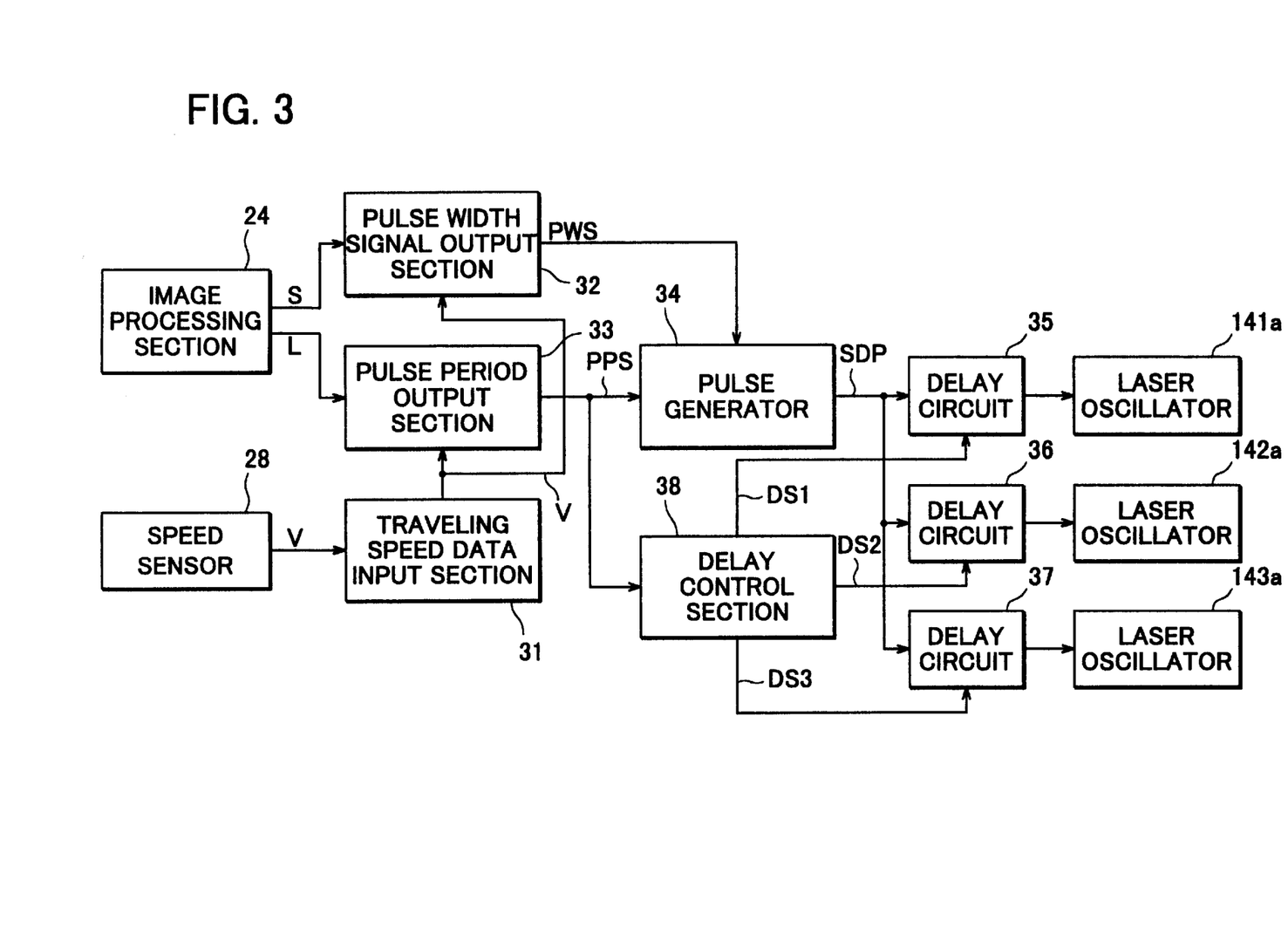
FIG. 3 is a block diagram showing various functional sections of the controller shown in FIG. 2.

The piercing apparatus further includes a controller 26 which serves as a control unit and which is configured to have functional sections as shown in FIG. 3. Specifically, the controller 26 includes a traveling speed data input section 31 for inputting tip paper traveling speed data V supplied from a speed sensor 28, a pulse width signal output section 32 for outputting a pulse width signal PWS such as to cause a deviation between an actual pulse width, detected based on minute hole area data S supplied from the inspection unit 16, and a target pulse width to be zero, and a pulse period signal output section 33 for outputting a pulse period signal PPS such as to cause a deviation between an actual pulse period, detected based on minute hole spacing data L supplied from the inspection unit 16, and a target pulse period to be zero. The target pulse width and the target pulse period, each of which varies depending on a combination of the kind of tip paper and the tip paper traveling speed, are set in advance as a function of these two parameters in the pulse width signal output section 32 and the pulse period output section 33, respectively.

The controller 26 further includes a pulse generator 34 for generating, based on the pulse width signal PWS and the pulse period signal PPS, a standard drive pulse SDP suitable for the formation of minute holes H of a desired size in the tip paper P with a desired spacing, a delay control section 38 for outputting a first, second and third delay control signals DS1, DS2 and DS3 which serve to delay the timings at which drive pulses are supplied to the first, second and third laser oscillators 141a, 142a and 143a, and a first, second and third delay circuits 35, 36 and 37 for obtaining a first, second and third delayed drive pulses by causing the standard drive pulse SDP to be delayed by a delay time which varies in dependence on the delay control signals DS1, DS2 or DS3.

The delay control section 38 is selectively rendered operative or inoperative. If the delay control section 38 is in an inoperative state, the delay circuits 35, 36 and 37 are rendered inoperative, so that the standard drive pulse SDP is supplied, without being delayed, to the first, second and third laser oscillators 141a, 142a and 143a. If the delay control section 38 is rendered operative, on the other hand, the delayed drive pulses are supplied to these laser oscillators, respectively.

Basically, the controller 26 serves to simultaneously provide the three laser piercing heads 14 with drive pulses at intervals of cycle T varying in dependence on the travel speed V of the tip paper P detected by the traveling speed sensor 28, to thereby pulse-drive these laser piercing heads 14 in a manner synchronized with one another, thereby forming three minute holes H, at a time, which are spaced in the traveling direction of the tip paper.

At this time, in accordance with the result of inspection effected by the image processing section 24 of the inspection unit 16 on the minute hole spacing L, the controller 26 controls the timings at which drive pulses are supplied to the laser oscillators 14a of the laser piercing heads 14, so as to form minute holes H in the tip paper P with a desired spacing L. At the same time, in accordance with the result of inspection effected by the inspection unit 16 on the minute hole area S, the controller 26 variably controls the drive pulse width PW so as to make the size of minute holes H constant.

More specifically, the controller 26 feedback-controls the pulse-driven cycle T of the laser oscillators 14a of the laser piercing heads 14 in accordance with a deviation between a target spacing set in advance in the controller and the result (actual spacing) of the inspection performed by the inspection unit 16 on the spacing L of minute holes H, thereby making the spacing L of the minute holes H constant. Further, in accordance with a deviation between a target area set in advance in the controller 26 and the result (actual area) of the inspection effected by the inspection unit 18 on the area S of the minute holes H, the controller 26 feedback-controls the pulse width PW and/or the output intensity of a pulsed laser beam, thereby making the size of the minute holes H constant.

In the following, the optical detection of minute holes H and image analysis performed by the inspection unit 16 will be further explained.

Figure 7:
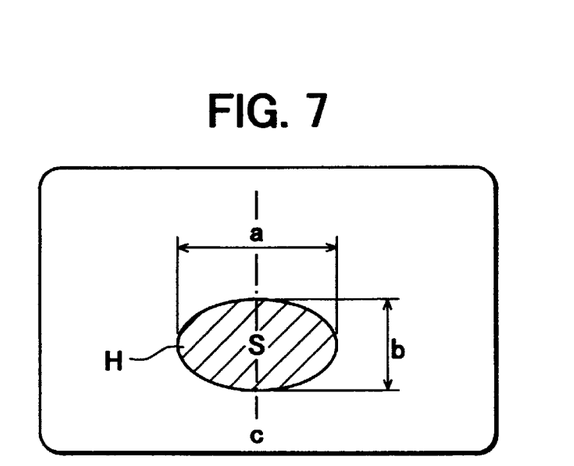
FIG. 7 is a view showing, by way of example, an image of a minute hole formed in a tip paper and optically detected by a camera shown in FIG. 2.

The camera 22 for optically detecting minute holes H formed in a tip paper P is comprised of, e.g., a CCD camera for picking up picture images of minute regions of the tip paper P at predetermined timing at a high speed, to thereby obtain a still picture image of each minute region of the tip paper. The timing at which a picture image is picked up by the camera 22 is set in synchronism with the timing at which the laser piercing heads 14 are pulse-driven and which varies depending on the traveling speed V of the tip paper P. In FIG. 7, an example of a picture image of minute hole H taken by the camera 22 is shown.

By analyzing such a picture image, the image processing section 24 measures the area S of and the spacing L between minute holes H formed in a single row in a tip paper P.

In the measurement of the spacing L, the image processing section 24 extracts information on the center position c of a minute hole image from the picture image obtained at the image picking-up timing. Since the tip paper P travels at a constant speed V and the timing for picking up a minute hole image is synchronized with the timing at which pulsed laser beams are irradiated for the formation of minute holes, the center positions c of minute hole images in picture images obtained at respective image picking-up timings are basically the same from one another. Thus, in accordance with a deviation of the center position c of a minute hole image obtained at each image picking-up timing, the image processing section 24 detects the spacing L of minute holes H.

In the measurement of the area S of a minute hole H (which is generally ellipse in shape), the image processing section 24 measures the major-axis and minor-axis lengths of the image of the minute hole H in the picture image, and determines the area S of the minute hole H in accordance with the measured lengths.

In accordance with the results of the image analysis, the controller 26 adjusts the width PW of the drive pulse for the laser oscillators 14a of the laser piercing heads 14, so that the area S of the minute hole H becomes a prescribed value S0 (not shown in the drawings), thereby changing the output of the laser oscillators 14a. At the same time, in accordance with the spacing L between minute holes determined, the cycle T at which drive pulses are supplied to the laser oscillators 14a of the laser piercing heads 14 is controlled by the controller 26 in a feedback manner.

In the following, explanations are given with respect to a control effected by the controller 26 in respect of the supply of drive pulses to the first, second and third laser oscillators 141a, 142a and 143a.

As explained above, the standard drive pulse SDP is supplied from the pulse generator 34 of the controller 26 to the first, second and third laser oscillators 141a, 142a and 143a through the first, second and third delay circuits 35, 36 and 37, respectively. The delay times for which drive pulses are delayed by the delay circuits 35, 36 and 37 are variably set, under the control of the delay control section 38, in accordance with the interval L0 between adjacent ones of the laser beam irradiated positions and the target spacing L of minute holes H.

Figure 4:
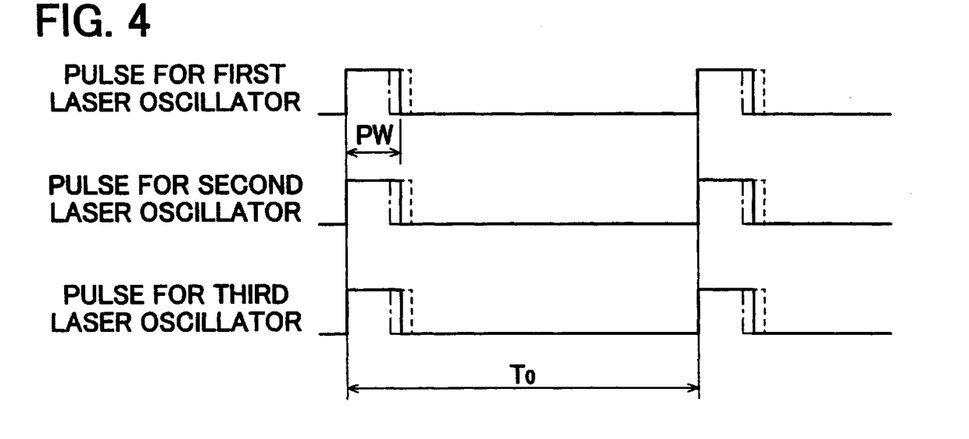
FIG. 4 is a view showing the timing at which drive pules are supplied to laser piercing heads in a case where minute holes are formed with a spacing which is equal to the distance between adjacent ones of positions at which laser beams are irradiated.

More specifically, in a case where the spacing L with which minute holes H are formed in a tip paper P is equal to the interval L0 at which the laser beam irradiated positions are spaced apart from one another, the delay control section 38 sets the respective delay times in the delay circuits 35, 36 and 37 to a value of zero, as shown in FIG. 4, so that the standard drive pulse SDP is supplied, without being delayed, to the respective laser oscillators 14a of the three laser piercing heads 14, thereby simultaneously driving these laser piercing heads. Further, the time interval T at which the standard drive pulse is generated is set to be equal to the time period T0 which is required for the tip paper P to travel at -the traveling speed V over a distance which is three times the laser beam irradiated position interval L0.

If the three laser piercing heads 14 are simultaneously pulse-driven in this manner while the tip paper P travels at the constant speed V, the tip paper P is formed with three minute holes H, at a time, which are spaced at the spacial interval L (=L0) in the tip paper traveling direction by means of three laser beams. Subsequently, when the period T0 at which the laser piercing heads 14 are pulse-driven elapses and hence the tip paper P travels over the distance 3L0, the laser piercing heads 14 are pulse-driven again, so that three minute holes H are formed. In this manner, the tip paper P is formed with minute holes H with the spacing L in sequence.

In addition, the time interval T0 at which the laser piercing heads 14 are pulse-driven can be made longer since it is enough for each laser piercing head 14 to be pulse-driven each time the tip paper P travels over the distance which is three times the minute hole spacing L. This makes it possible to stabilize the operation of the laser piercing heads 14, especially, when the tip paper P travels at a high speed.

Figure 5:
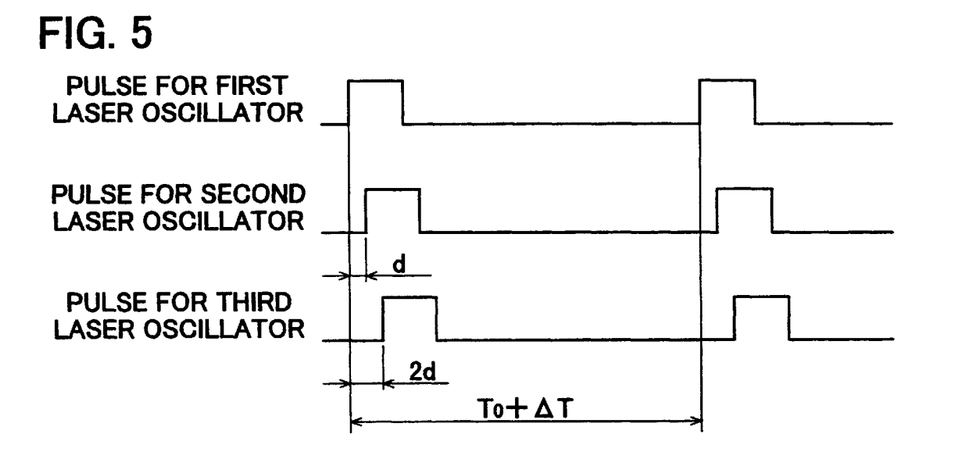
FIG. 5 is a view showing the timing at which drive pules are supplied to laser piercing heads in a case where minute holes are formed with a spacing which is larger than the distance between adjacent ones of laser beam irradiated positions.

In a case where minute holes H must be formed with a spacing L1 which is longer than the laser beam irradiated position interval L0, the timing at which a downstream-side laser piercing head 14, as viewed in the tip paper traveling direction, is pulse-driven is delayed relative to the timing at which an upstream-side laser piercing head 14 is pulse-driven, as shown in FIG. 5. More specifically, the delay times in the first, second and third delay circuits 35, 36 and 37 are set to values of zero, d and 2d, respectively. As a result, the timing at which a pulsed laser beam is irradiated by the third laser piercing head 143, disposed on the lowermost stream-side as viewed in the tip paper traveling direction, lags behind the irradiation timing of the second laser piercing head 142, by the delay time d. The latter irradiation timing lags behind, by the time period d, the irradiation timing of the first laser piercing head 141 disposed on the uppermost stream-side. Further, the period at which the laser piercing heads 14 are pulse-driven is set to a value equal to a time period T+ΔT required for the tip paper P to travel at the traveling speed V over the distance which is three times the spacing L1 with which minute holes are to be formed.

In this manner, by pulse-driving the laser piercing head 142 or 143 on the downstream side at the timing which lags behind, by the delay time d, the timing at which the laser piercing head 141 or 142 on the upstream side is pulse-driven, the tip paper P is formed with minute holes with a desired spacing L1 which is longer than the laser beam irradiated position interval L0 by irradiating three pulsed laser beams at different timings because the tip paper P travels during the delay time d, i.e., during the time period from when the upstream-side head performs its minute hole forming action to when the downstream-side head perform its similar action.

Figure 6:
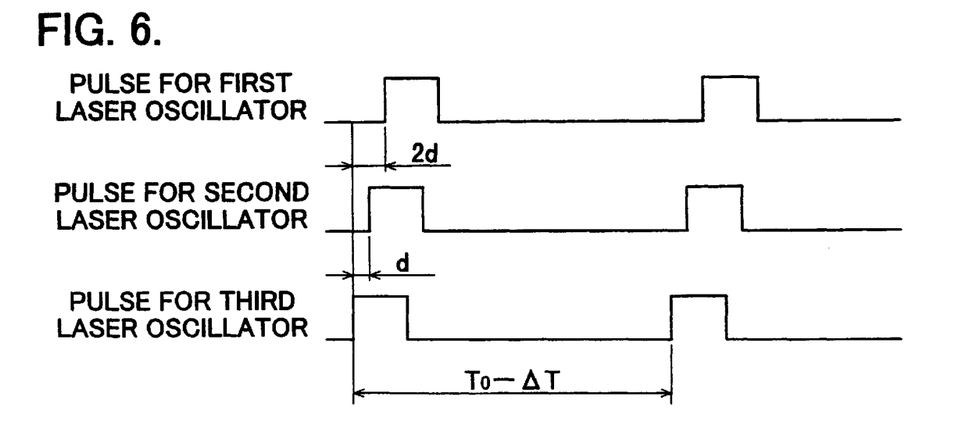
FIG. 6 is a view showing the timing at which drive pules are supplied to laser piercing heads in a case where minute holes are formed with a spacing which is less than the distance between adjacent ones of laser beam irradiated positions.

On the other hand, in a case where minute holes H must be formed with a spacing L2 which is shorter than the laser beam irradiated position interval L0, the timing, at which an upstream-side laser piercing head 14 is pulse-driven, is delayed relative to the timing at which a downstream-side laser piercing head 14 is pulse-driven, as shown in FIG. 6. Specifically, the delay times in the first, second and third delay circuits 35, 36 and 37 are set to values of 2d, d and zero, respectively. As a result, the timing at which a pulsed laser beam is irradiated by the first or second laser piercing head 141 or 142 lags behind the irradiation timing of the second or third laser piercing head 142 or 143 by the delay time d. Further, the period at which the laser piercing heads 14 are pulse-driven is set to a value equal to a time period T-ΔT required for the tip paper P to travel at the traveling speed V over the distance which is three times the spacing L2 with which minute holes are to be formed.

By controlling the timings at which the three laser piercing heads 14 are driven in this manner, the formation of a minute hole by the second laser piercing head 142 is carried out at the timing which leads, by the time period d, the timing at which the first laser piercing head 141 on the uppermost stream-side forms a minute hole, and the formation of minute hole by the third laser piercing head 143 on the lowermost stream-side is carried out at the timing which leads, by the time period d, the minute hole formation timing by the second laser piercing head 142. Since the spacing between the minute hole formed by the downstream-side laser piercing head 142 or 143 and that formed by the upstream-side head 141 or 142 is shortened by an amount corresponding to the lead amount of drive timing, the spacing with which minute holes are formed in the tip paper P is controlled to a desired value L2 shorter than the laser beam irradiated position interval L0.

According to the piercing apparatus of this embodiment, it is possible to continuously form minute holes H with a desired spacing by simply controlling the timings at which the laser piercing heads 14 are driven, without the need of changing the positions to which laser beams are irradiated, or without the need of modifying the construction of an optical system of the piercing apparatus. In addition, plural minute holes can be formed at a time with use of the laser piercing heads 14, so that the period at which each laser piercing head 14 is to be driven can be lengthened. As a consequence, minute holes H can be continuously formed in the tip paper P while the operation of the laser piercing heads 14 are stabilized, even if the tip paper travels at a high speed.

According to the piercing apparatus of this embodiment where the laser oscillators 14a of the laser piercing heads 14 are pulse-driven under feedback control effected in accordance with the results of the image analysis on minute hole H, minute holes each having a required size (area S) which varies depending on requirements on the air permeability of a tip paper can be formed in a stable manner with a required spacing L which also varies depending on the air permeability requirement, without the need of actually measuring the air permeability of the tip paper P formed with the minute holes H.

The present invention is not limited to the foregoing embodiment, and can be modified variously.

For example, the number of laser piercing heads are not limited to three. Four or more laser piercing heads may be provided, especially when a tip paper must be traveled at a higher speed. It is expected that certain advantages can be attained even by using a piercing apparatus provided with two laser piercing heads.

A delay time in respect of drive pulse for each laser piercing head may be determined depending on a laser beam irradiated position interval, desired minute hole spacing, tip paper traveling speed, etc.

Although the size of minute holes is adjusted by variably setting the drive pulse width in the foregoing embodiment, the laser beam output intensity may be varied for an adjustment of minute hole size.

Further, in order to make the spacing with which minute holes are formed constant without being affected by a variation in tip paper traveling speed, the delay time in respect of the supply of drive pulses to laser piercing heads may be variably adjusted depending on the variation in traveling speed.

In order to measure the size and the spacing of minute holes, an optical line sensor or an optical area sensor may be employed instead of a camera 22.

Although a piercing apparatus of a single bobbin type forming minute holes in a single row has been explained in the foregoing embodiment, the present invention is also applicable to a piercing apparatus of a type forming minute holes in two or more rows in a single tip paper or a type forming minute holes in one or more rows in each of two or more tip papers which are arranged to simultaneously travel between a feeding section and a winding section of the piercing apparatus. In either case, it is enough to provide a piercing section of the piercing apparatus with laser piercing heads whose number is more than two times the total number of the rows of minute holes.

With regard to other respects, the present invention may be also variously modified without departing from the sprit of this invention.

What is claimed is:

1. A piercing apparatus for a tip paper used to connect a cigarette with a filter plug, comprising:
   a traveling unit causing the tip paper to travel along a traveling path defined in said piercing apparatus;
   a plurality of laser units intermittently irradiating pulse-driven pulsed laser beams onto plural positions on the traveling path which are spaced apart from one another in a direction along which the tip paper travels, to thereby form minute holes in the tip paper which travels along the traveling path;
   a control unit pulse-driving said plurality of laser units such that the pulsed laser beam irradiating actions are carried out in synchronism with one another, said control unit obtaining a delayed drive pulse by time-delaying a standard drive pulse supplied to a laser unit which irradiates a pulsed laser beam onto a lowermost or uppermost position, among the plural positions, as viewed in the traveling direction of the tip paper, and supplies the delayed drive pulse to another pulsed laser unit or an associated one of the other pulsed laser units, and wherein said control unit controls at least one of a pulse width of the drive pulses and a time interval at which the drive pulses are generated; and an inspection unit in communication with said control unit, said inspection unit collecting minute hole data indicative of at least one minute hole, wherein a delay time for which the delayed drive pulse is delayed relative to the standard drive pulse is determined dependent upon a target spacing with which the minute holes are to be formed, the traveling speed of the tip paper, and a distance between the positions at which the pulsed laser beams are irradiated from those laser units which are supplied with the standard drive pulse and the delayed drive pulse, respectively.

2. The piercing apparatus according to claim 1, wherein each of said plurality of laser units includes a laser oscillator, the laser oscillator generating a pulsed laser beam in response to a supply of drive pulses.

3. The piercing apparatus according to claim 1, wherein said piercing apparatus includes at least three laser units which are pulse-driven.

4. The piercing apparatus according to claim 3, wherein said at least three laser units are pulse-driven simultaneously to form three consecutive minute holes.

5. The piercing apparatus of claim 1, wherein said minute hole data is at least a measured area along the axes of a minute hole image.

6. The piercing apparatus of claim 5, wherein said minute hole image is collected with a camera.

7. The piercing apparatus of claim 1, wherein said inspection unit is comprised of an image processing section, said image processing section measuring a spacing between two consecutive minute hole images.

8. The piercing apparatus of claim 7, wherein the measured spacing between two holes is communicated to said control unit and used to control a timing at which drive pulses are supplied to said plurality of laser units.

9. The piercing apparatus according to claim 1, wherein said control unit pulse-drives said plurality of laser units asynchronously to control a spacing between consecutive minute holes.

10. The piercing apparatus according to claim 1, wherein said control unit increases a spacing between consecutive minute holes by pulse-driving a first laser unit at a predetermined first time, then pulse-driving a second laser unit at a second time delayed from said predetermined first time, and pulse-driving a third laser unit at a third time delayed from said second time, wherein said second and third laser units are positioned downstream of said first laser unit.

11. The piercing apparatus according to claim 1, wherein said control unit decreases a spacing between consecutive minute holes by pulse driving a third laser unit at a predetermined first time, then pulse-driving a second laser unit at a second time delayed from said predetermined first time, and pulse-driving a first laser unit at a third time delayed from said second time, wherein said second and third laser units are positioned downstream of said first laser unit.

12. The piercing apparatus according to claim 1, wherein said control unit being capable of controlling a width of each of said pulsed laser beams in order to vary an area of said minute holes.

* * * * *